United States Patent [19]
Brcic

[11] 3,992,968
[45] Nov. 23, 1976

[54] STEEL CUTTING MACHINE

[76] Inventor: Mario Brcic, 807-94th Ave. N., Naples, Fla. 33940

[22] Filed: Oct. 6, 1975

[21] Appl. No.: 619,945

[52] U.S. Cl. .............................. 83/468; 83/477.2; 83/478; 83/488
[51] Int. Cl.² ................................. B23D 45/02
[58] Field of Search ............... 83/477.2, 478, 581, 83/488, 466.1, 468, 471.2, 471.3, 743, 745

[56] References Cited
UNITED STATES PATENTS

| | | | |
|---|---|---|---|
| 1,028,103 | 6/1912 | Fergusson | 83/488 X |
| 1,185,095 | 5/1916 | Hendee | 83/488 x |
| 1,193,385 | 8/1916 | Hieatzman | 83/488 X |
| 2,750,970 | 6/1956 | Gaskell | 83/478 |
| 3,170,352 | 2/1965 | Hensley | 83/478 X |
| 3,296,914 | 1/1967 | Shallenberg | 83/488 |
| 3,841,188 | 10/1974 | Wiater | 83/581 X |
| 3,853,028 | 12/1974 | Jagers | 83/471.3 x |
| 3,872,761 | 3/1975 | Gutowski et al. | 83/581 X |

*Primary Examiner*—Frank T. Yost

[57] ABSTRACT

A machine for cutting steel stock of various shape such as angle irons, channel, flat bars, eye beams, tubing and pipe, the machine performing the cutting at a very high speed; the machine including a table with a circular saw driven by an electric motor, and the machine also including an adjustable guard with a view opening for observing a cutting operation, a magnetic starter, and adjustable stop, a cover plate for cleaning out chips, and additionally having an angle adjustment member for angular cutting.

1 Claim, 5 Drawing Figures

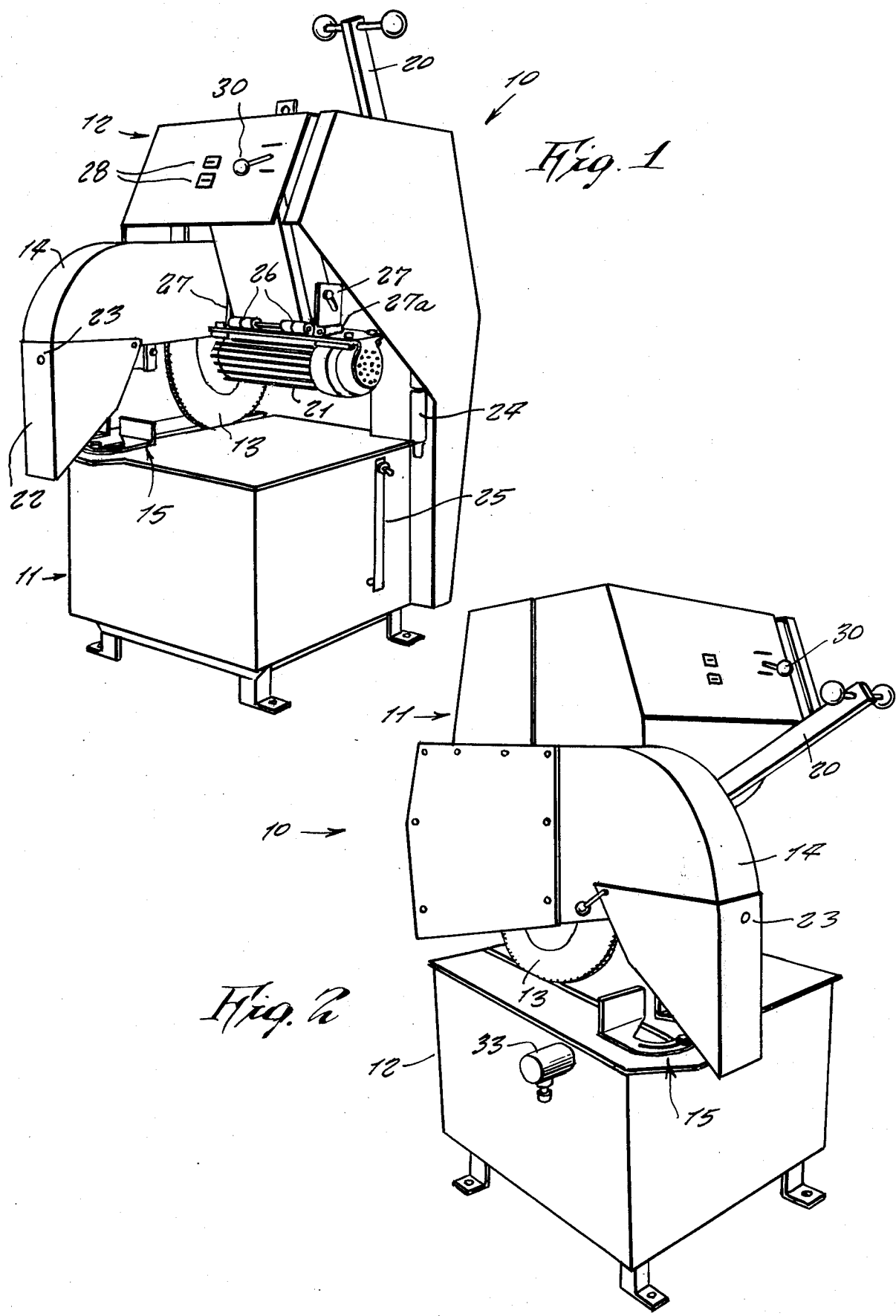

STEEL CUTTING MACHINE

This invention relates generally to steel cutting machines.

A principal object of the present invention is to provide a steel cutting machine which cuts steel at a tremendous rate of speed so that the cutting operation is quickly accomplished so to save on time.

Another object of the present invention is to provide an M. Brcic steel cutting machine which is cutting various steel stock such as angle irons, channels, flat bars, tubing, standard pipes, I-beams and the like.

Still another object is to provide an M. Brcic steel cutting machine wherein the material that is being cut, does not have to be held or bolted down but which can be simply held in place by free hands.

Still another object is to provide an M. Brcic steel cutting machine which accordingly would be particularly useful in architectural ornamental iron shops, structural steel shops, electrical shops, shops of plumbing contractors and the like.

Yet a further object of the present invention is to provide an M. Brcic steel cutting machine which develops a speed of up to 3,600 rpm and which can be driven by a 12 horse power electric motor.

Other objects are to provide an M. Brcic steel cutting machine which is simple in design, inexpensive to manufacture, rugged in construction, easy to use and efficient in operation.

These and other objects will be readily evident upon a study of the following specification and the accompanying drawings wherein:

FIG. 1 is a front perspective view of the machine as viewed from a right side.

FIG. 2 is a front perspective view thereof as viewed from a left side.

Figure 3:
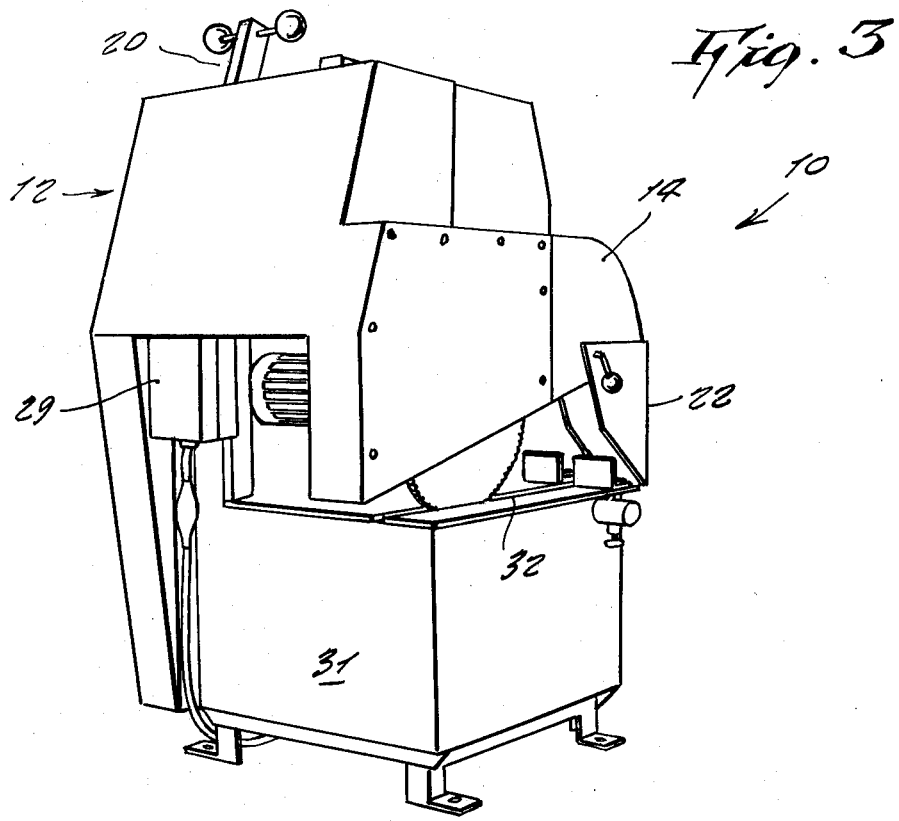
FIG. 3 is a rear perspective view thereof as viewed from a left side.
Figure 4:
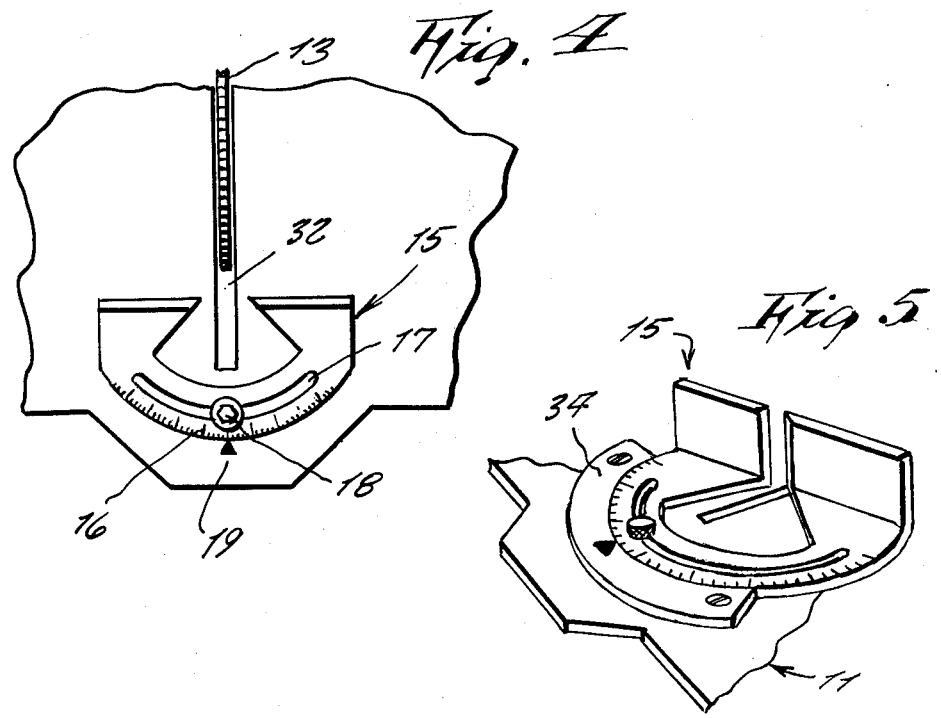
FIG. 4 is an enlarged fragmentary plan view showing an angle adjustment member of the machine.

Reference is now made to the drawings in detail, and more particularly to FIGS. 1 through 4 thereof at this time wherein the reference numeral 10 represents an M. Brcic steel cutting machine model 101-75 according to the present invention wherein there is a square base portion 11 having an overhead portion 12 which includes motor means for driving the cutting blade 13 at extremely high speed for cutting material without having to bolt or hold the material down; the operator merely using free hands on the material so to pass it against the cutting blade 13.

The cutting blade 13 is covered by a safety fender 14. Secured to the base and in alignment with blade 13 is an angle adjustment member 15 having a plurality of angle graduations 16 indicating degrees.

An arcuate slot 17 of member 15 enables member 15 to be adjustable by the bolt 18 received therein which allows the graduations 16 to be aligned with the mark 19, the mark 19 being of arrowhead shape.

A handle linkage 20 provides operation means for the overhead portion 12 in order to cut out the material on the machine 10. The motor means comprises a motor 21 which rotates at 3,600 rpm, the motor being of 12 horse power.

As shown in the drawings, the fender 14 serves as a protective guard for the operator, the fender including a downward extending shield 22 having a viewing hole 23 for permitting an operator to observe the progress of the work as it is being cut by the blade. An adjustable stop 24 is included upon the machine for automatically limiting the travel of the blade, thus saving time for accomplishing the same manually. A blade lock 25 is provided for purpose of notching and trimming material which may be in a sheet form. As is clearly shown in FIG. 1, the motor 21 is supported from hinges 26 so that the motor may be pivoted upwardly or downward so to adjust to the diametrical size of the circular blade mounted on the motor shaft. In this respect, it should be noted as the blade is progressively worn down, its diametrical size becomes smaller so that the motor must be pivoted downwardly to accomodate this change. The motor is firmly secured in its pivoted, adjusted position by plates 27 at each end having angular slots for receiving mounting bolts. A pipe 27a serves to receive a long bar so that a person has longer leverage to pivot the heavy motor while making the adjustment. It will accordingly be noted that the provision of such an adjustment will allow a use of a blade for a longer period of time, thus saving on the cost of otherwise more frequent blade replacement.

Referring now to the control panel on FIG. 1, it will be noted that there is a push button control 28 for a magnetic starter 29 shown in FIG. 3. A hand release and automatic lock 30 is also provided upon the control panel for the motor and blade. A cover plate 31 may be made removable in order to clean out chips of material that are dropped down into the slot 32 by the cutting blade. A support 33 shown in FIG. 2 serves as a stop for holding material that is being cut.

Figure 5:
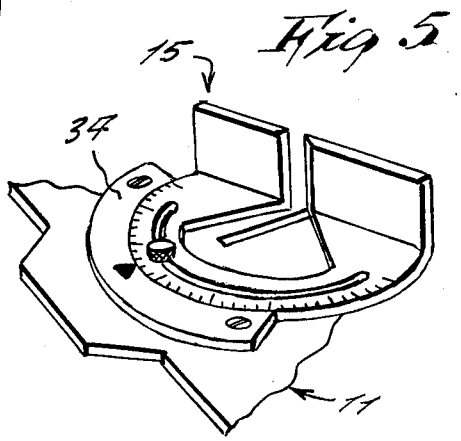
FIG. 5 is a perspective view thereof and showing a modified design wherein the angle adjustment member is braced within an arcuate stop so that it is not shifted sidewardly during adjustment in order to obtain a greater angular reading.

Referring now to FIG. 5 of the drawing, the above described angle adjustment member 15 for providing mitre cuts can be additionally provided with a stationary arcuate bar 34 that is rigidly affixed upon the top surface of the machine table so that the angle adjustment member 15 can be firmly positioned thereagainst while being rotated so that it does not shift sidewardly, thus producing a more accurate angular measuring. Thus a modified design to the invention is provided.

While various changes may be made in the detail construction, it is understood that such changes will be within the spirit and scope of the present invention as is defined by the appended claims.

What I claim is:

1. A steel cutting machine, comprising in combination, a base member supporting an overhead portion, an ultra high speed cutting blade carried by said overhead portion to cut through material held down by the hand of an operator, an angle adjuster member carried by said base for adjusting the angle of said material when directed against said blade, said blade being secured by nut fastener means and washer plate means to a drive of a high speed motor contained within said overhead portion, said high speed motor rotating said blade at ultra high speed, thus effecting a quick cut of said material when placed upon said base member, a fender secured to said overhead portion, said fender carrying a downward shield, said fender and said shield enclosing around a forward edge of said blade, said shield having a viewing opening therethrough for observation of a cutting action by said blade, said angle adjustment member being L-shaped by including a flat horizontal portion and a pair of upwardly vertical lip portions along one edge thereof, said lip portions being straight aligned with each other and having a notch therebetween that communicates with a flaring notch in said horizontal portion of said angle adjustment member, a calibrated, arcuate notch on said horizontal portion receiving a vertical bolt secured to said base member and about which said angle adjustment member is pivotable to change an angle of said lip portion respective to said blade, a straight slot upon said base portion, and in which said blade extends, said vertical bolt being aligned with said base member slot and positioned near one end thereof, said angle adjustment member resting against an arcuately affixed plate upon said base.

* * * * *